(12) United States Patent
Katsuki et al.

(10) Patent No.: US 11,907,809 B2
(45) Date of Patent: *Feb. 20, 2024

(54) INFORMATION PROCESSING APPARATUS, PROGRAM, AND INFORMATION PROCESSING METHOD

(71) Applicant: International Business Machines Corporation, Armonk, NY (US)

(72) Inventors: Takayuki Katsuki, Tokyo (JP); Yuma Shinohara, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 1370 days.

This patent is subject to a terminal disclaimer.

(21) Appl. No.: 16/268,815

(22) Filed: Feb. 6, 2019

(65) Prior Publication Data

US 2019/0171971 A1   Jun. 6, 2019

Related U.S. Application Data

(63) Continuation of application No. 15/838,653, filed on Dec. 12, 2017, now Pat. No. 10,289,964, which is a
(Continued)

(30) Foreign Application Priority Data

Sep. 22, 2014   (JP) .................. 2014-192511

(51) Int. Cl.
  *G06N 20/00*   (2019.01)
  *G06N 7/01*   (2023.01)
(52) U.S. Cl.
  CPC .............. *G06N 20/00* (2019.01); *G06N 7/01* (2023.01)

(58) Field of Classification Search
  CPC ........ G06F 17/18; G06N 5/02; G06N 99/005; G06Q 50/06
  See application file for complete search history.

(56) References Cited

U.S. PATENT DOCUMENTS

| 6,040,853 A | 3/2000 | Delagnes et al. |
| 6,611,825 B1 | 8/2003 | Billheimer et al. |
| (Continued) |

FOREIGN PATENT DOCUMENTS

| JP | 09166435 A | 6/1997 |
| JP | 10204821 A | 8/1998 |
| (Continued) |

OTHER PUBLICATIONS

Murakami, et al., "Manipulating Data to Maintain Transport Infrastructure", Fujitsu, Nov. 2013, pp. 630-637.
(Continued)

*Primary Examiner* — Luis A Sitiriche
(74) *Attorney, Agent, or Firm* — Stosch Sabo

(57) ABSTRACT

Various embodiments train a prediction model for predicting a label to be allocated to a prediction target explanatory variable set. In one embodiment, one or more sets of training data are acquired. Each of the one or more sets of training data includes at least one set of explanatory variables and a label allocated to the at least one explanatory variable set. A plurality of explanatory variable subsets is extracted from the at least one set of explanatory variables. A prediction model is trained utilizing the training data. The plurality of explanatory variable subsets is reflected on a label predicted by the prediction model to be allocated to a prediction target explanatory variable set with each of the plurality of explanatory variable subsets weighted respectively.

20 Claims, 7 Drawing Sheets

Related U.S. Application Data continuation of application No. 15/420,174, filed on Jan. 31, 2017, now Pat. No. 9,928,468, which is a continuation of application No. 14/861,182, filed on Sep. 22, 2015, now Pat. No. 9,922,292.

(56) References Cited

U.S. PATENT DOCUMENTS

| | | |
|---|---|---|
| 9,081,385 B1 | 7/2015 | Ferguson et al. |
| 9,087,294 B2 | 7/2015 | Kojaku et al. |
| 9,922,292 B2 | 3/2018 | Katsuki et al. |
| 9,928,468 B2 | 3/2018 | Katsuki et al. |
| 2004/0111169 A1 | 6/2004 | Hong et al. |
| 2006/0224528 A1 | 10/2006 | Liu et al. |
| 2008/0319951 A1 | 12/2008 | Ueno et al. |
| 2010/0208937 A1 | 8/2010 | Kmiecik et al. |
| 2011/0071965 A1 | 3/2011 | Long et al. |
| 2013/0246608 A1 | 9/2013 | Liu et al. |
| 2014/0063232 A1 | 3/2014 | Fairfield et al. |
| 2016/0196505 A1 | 7/2016 | Katsuki et al. |
| 2017/0140303 A1 | 5/2017 | Katsuki et al. |
| 2018/0101792 A1 | 4/2018 | Katsuki et al. |
| 2018/0114146 A1 | 4/2018 | Katsuki et al. |

FOREIGN PATENT DOCUMENTS

| | | |
|---|---|---|
| JP | 2007047137 A | 2/2007 |
| JP | 2010014960 A | 1/2010 |
| JP | 2010067033 A | 3/2010 |
| JP | 2011242942 A | 12/2011 |
| JP | 2012007922 A | 1/2012 |
| JP | 2013196680 A | 9/2013 |
| JP | 2014142702 A | 8/2014 |

OTHER PUBLICATIONS

Decision to Grant a Patent, Application No. 2014-192511. dated Jun. 24, 2016. Translated Sep. 10, 2016. 6 pages.

Japan Search Report, Patent Application No. 2014-192511. dated May 25, 2016. Translated Sep. 10, 2016. 50 pages.

Unknown, "Characteristic Quantity", Information Processing Society of Japan, based on a partial type for a time series classification. Report of Research Mathematical-model-izing problem solving (MPS), JP, Information Processing Society of Japan, Feb. 24, 2014.

Katsuki et al., "Information Processing Apparatus, Program, and Information Processing Method", Japan Application No. 2014-192511 (English Translation), filed Sep. 22, 2014. 46 pages.

IBM, List of IBM Patents or Patent Applications Treated as Related, Feb. 5, 2019, 2 pages.

INFORMATION PROCESSING APPARATUS, PROGRAM, AND INFORMATION PROCESSING METHOD

BACKGROUND

The present invention relates to an information processing apparatus, a program, and an information processing method for performing machine learning.

As a method of photographing a road surface or the like with an apparatus mounted on a vehicle and analyzing a traffic situation and a road condition, Patent Literatures JP2012-7922A and JP10-204821A are known. It is also known that an MCI (a maintenance control index of a road) indicating soundness of a road in each of sections is estimated on the basis of features of the road derived from moving images and the like recorded in a drive recorder. See, for example, ([[http://img.jp.fujitsu.com/downloads/jp/jmag/vol64-6/paper04.pdf]]—Realization of Efficient Maintenance Control of Social Infrastructure, Shigeyuki Murakami, et al., P. 30-637, FUJITSU. 64, 6, 11, 2013. However, not all of the features of the entire road are always fully reflected on the MCI. In a method using a conventional regression analysis for predicting the MCI from the features of the entire road, it is impossible to accurately predict the MCI.

BRIEF SUMMARY

One or more embodiments provide a prediction model capable of more accurately predicting, from a data set of, for example, each of sections such as moving images of a road recorded by a drive recorder, a label such as an MCI corresponding to the data set.

In one embodiment, a method for training a prediction model for predicting a label to be allocated to a prediction target explanatory variable set is disclosed. The method comprises acquiring one or more sets of training data. Each of the one or more sets of training data comprises at least one set of explanatory variables and a label allocated to the at least one explanatory variable set. A plurality of explanatory variable subsets is extracted from the at least one set of explanatory variables. A prediction model is trained utilizing the training data, where the plurality of explanatory variable subsets is reflected on a label predicted by the prediction model to be allocated to a prediction target explanatory variable set with each of the plurality of explanatory variable subsets weighted respectively.

In another embodiment, an information processing apparatus for training a prediction model for predicting a label to be allocated to a prediction target explanatory variable set is disclosed. The information processing apparatus comprises a memory and a processor communicatively coupled to the memory. The information processing apparatus further comprises an acquiring unit, an extracting unit, and a training processing unit. The acquiring unit is to acquire one or more sets of training data. Each of the one or more sets of training data comprises at least one set of explanatory variables and a label allocated to the at least one explanatory variable set. The extracting unit is to extract a plurality of explanatory variable subsets from the at least one set of explanatory variables. A training processing unit is to train a prediction model, where the prediction model is trained utilizing the training data where the plurality of explanatory variable subsets is reflected on a label predicted by the prediction model to be allocated to a prediction target explanatory variable set with each of the plurality of explanatory variable subsets weighted respectively.

In yet another embodiment, a program product for causing a computer to train a prediction model for predicting a label to be allocated to a prediction target explanatory variable set is disclosed. The program product, when executed, causes the computer to perform a method. The method comprises acquiring one or more sets of training data. Each of the one or more sets of training data comprises at least one set of explanatory variables and a label allocated to the at least one explanatory variable set. A plurality of explanatory variable subsets is extracted from the at least one set of explanatory variables. A prediction model is trained utilizing the training data, where the plurality of explanatory variable subsets is reflected on a label predicted by the prediction model to be allocated to a prediction target explanatory variable set with each of the plurality of explanatory variable subsets weighted respectively.

Note that the summary of the invention does not enumerate all of necessary features of the present invention. Sub-combinations of a group of these features could also be inventions.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

The present disclosure is described below through an embodiment of the disclosure. However, the following embodiment does not limit inventions according to claims. Not all of combinations of features described in the embodiment are always essential for the solution of the disclosure.

FIGS. 1A-1D show an example of a relation between a road condition and an MCI. The MCI is a value obtained by quantitatively evaluating a condition of a paved road surface in each of sections in order to be used as a standard for repair and the like. The MCI is a value calculated on the basis of a crack ratio, a rutting amount, and/or a vertical unevenness amount of a road surface. Repair of a road is usually considered necessary, for example, when the MCI is smaller than 5.

As the MCI, an accurate value is periodically measured by a measurement vehicle or the like mounted with a dedicated measurement apparatus. On the other hand, it is possible to simply evaluate a road condition as appropriate by, for example, analyzing moving images and the like of a drive recorder of a general-purpose passenger vehicle and estimating the MCI. As a premise of this evaluation, it is desirable to train in advance a relation between an accurate MCI measured by the dedicated measurement vehicle and the moving images and the like of the drive recorder.

Figure 1A:
FIGS. 1A-1D show an example of a relation between a road condition and an MCI.
Figure 1B:
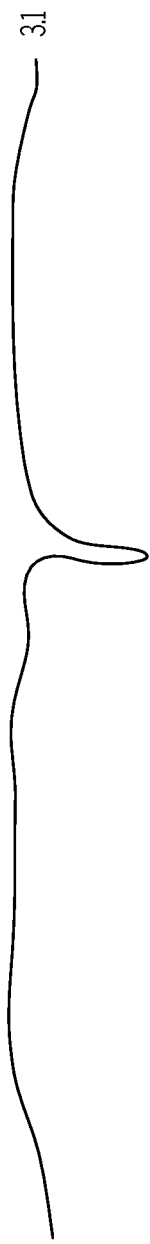
Figure 1C:
Figure 1D:

FIGS. 1A to 1D show examples of surface condition of roads in each of sections used for training and examples of MCIs given in association with the roads. FIG. 1A shows a road on which a large number of relatively large irregularities occur in the entire section and, as a result, the MCI is 3. FIG. 1B shows a road on which a large hole is opened in one place in the section but the other places in the section are flat and, as a result, the MCI is 3.1. FIG. 1C shows a road on which large holes are opened in two places in the section but the other places in the section are flat and, as a result, the MCI is 2.9. FIG. 1D shows a road on which no large irregularities and holes are present in the section and, as a result, the MCI is 6.

Whereas defects occur over the entire road in FIG. 1A, a defect occurs only in a part of the road in FIGS. 1B and 1C. Features of both the roads are dissimilar as a whole. Therefore, completely different features are extracted from the roads of FIG. 1A and FIG. 1B or 1C. However, in training of an MCI, it is necessary to train a prediction model for predicting an MCI having substantially the same value from the completely different features of FIGS. 1A to 1C.

On the other hand, features are similar in most parts of the roads including the defects only in a part shown in FIGS. 1B and 1C and the road including substantially no defect shown in FIG. 1D. Therefore, similar features are extracted from the roads of FIG. 1B or 1C and FIG. 1D. However, in the training of an MCI, it is necessary to train a prediction model for predicting MCIs having completely different values from the similar features of FIGS. 1B to 1D.

In this way, calculation rules for calculating an MCI are nonlinear and complicated. It is difficult to generate a prediction model for accurately predicting an MCI using simple measurement data like measurement data of the drive recorder as training data. The information processing apparatus according to the present invention more accurately trains a nonlinear relation between such a simply measured data set and label allocation.

Figure 2:
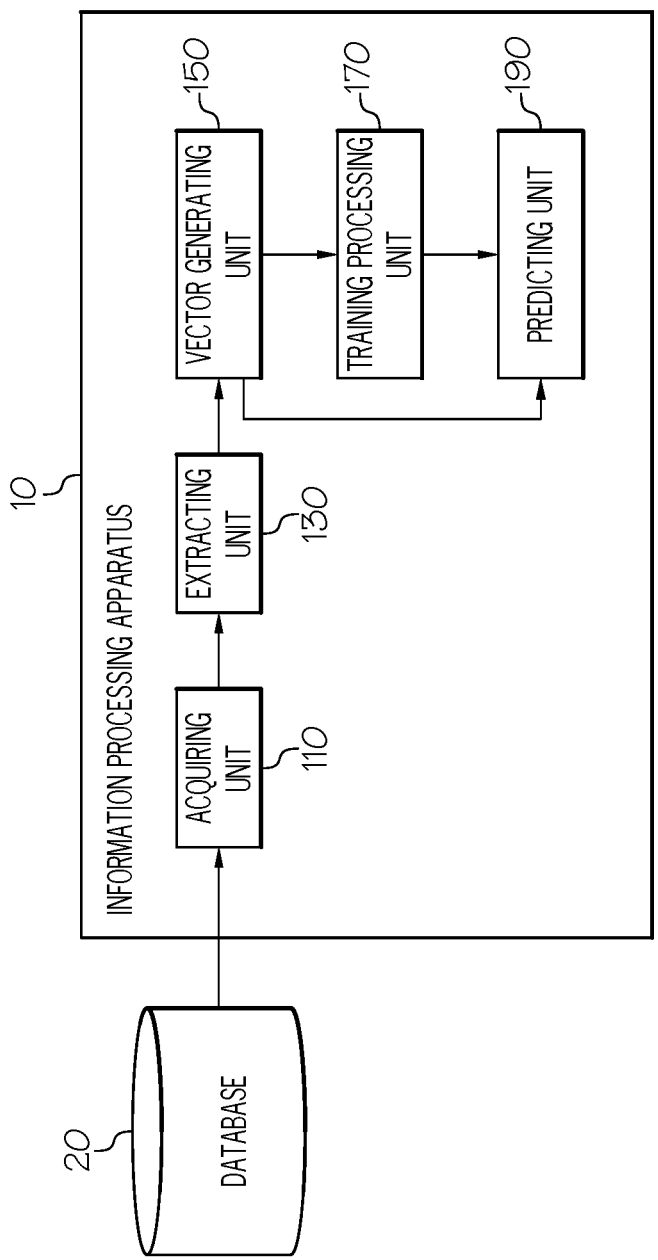
FIG. 2 shows a block diagram of an information processing apparatus of an embodiment.

FIG. 2 shows a block diagram of an information processing apparatus 10 according to this embodiment. The information processing apparatus 10 trains, using training data including a plurality of explanatory variable sets and labels for training allocated to the respective explanatory variable sets in advance, a prediction model for predicting a label to be allocated to a prediction target data set and predicts a label from prediction target data on the basis of the trained prediction model. The information processing apparatus 10 includes a feature value acquiring unit 110, an extracting unit 130, a vector generating unit 150, a training processing unit 170, and a predicting unit 190.

The acquiring unit 110 acquires data used for processing by the information processing apparatus 10. For example, the acquiring unit 110 acquires, from an external database 20 or the like, training data in which labels for training are allocated to a plurality of explanatory variable sets. As an example, the information processing apparatus 10 acquires training data including, as a plurality of data sets, moving images of a road in each of a plurality of sections photographed by a drive recorder and including, as labels, measured MCIs of the sections.

For example, the acquiring unit 110 may acquire, from the external database 20 or the like, prediction target data including a plurality of prediction target data sets serving as prediction targets. The acquiring unit 110 supplies the acquired training data and prediction target data to the extracting unit 130.

The extracting unit 130 extracts a plurality of subsets from each of the plurality of data sets in the training data and the prediction target data. For example, the extracting unit 130 extracts, as the plurality of subsets, subsets obtained by dividing the moving images or the like of the road of each of sections acquired as the plurality of data sets by predetermined time. The extracting unit 130 supplies the plurality of subsets extracted concerning the plurality of data sets to the vector generating unit 150.

The vector generating unit 150 generates, concerning each of the subsets related to the training data and the prediction target data, a feature vector including a plurality of feature values representing features of the subsets. For example, the vector generating unit 150 converts data of the moving images of the road (e.g., luminance information of the road) included in the subsets into a plurality of feature values and generates, for each of the subsets, a feature vector including the plurality of feature values. Specific processing contents of the vector generating unit 150 are described below. The vector generating unit 150 supplies the feature vector generated concerning the training data to the training processing unit 170 and supplies the feature vector generated concerning the prediction target data to the predicting unit 190.

The training processing unit 170 trains, in each of the plurality of explanatory variable sets, a prediction model in which each of the plurality of subsets is weighted and the subsets are reflected on prediction of a label. Consequently, the training processing unit 170 builds a prediction model for distinguishing the subset reflected heavily on the prediction of a label and the subset not reflected much on the prediction of a label and then predicting a label from the plurality of subsets. Specific processing contents of the training processing unit 170 are described below. The training processing unit 170 supplies the prediction model obtained as a result of the training to the predicting unit 190.

[The predicting unit 190 predicts, on the basis of the prediction model trained by the training processing unit 170, a label corresponding to the data set of the prediction target data. For example, the predicting unit 190 applies the feature vector generated concerning the plurality of data sets of the prediction target data to the prediction model and predicts a label corresponding to the data set of the prediction target data. Specific processing contents of the predicting unit 190 are described below.

As described above, the information processing apparatus 10 extracts the plurality of subsets from the data set serving as a target of label allocation, performs different weighting for each of the subsets, and generates a prediction model. Consequently, the information processing apparatus 10 can use, at a larger ratio, a portion significantly affecting a label among the subsets for prediction and can train a more accurate prediction model than a method of uniformly using the entire data set for prediction.

Figure 3:
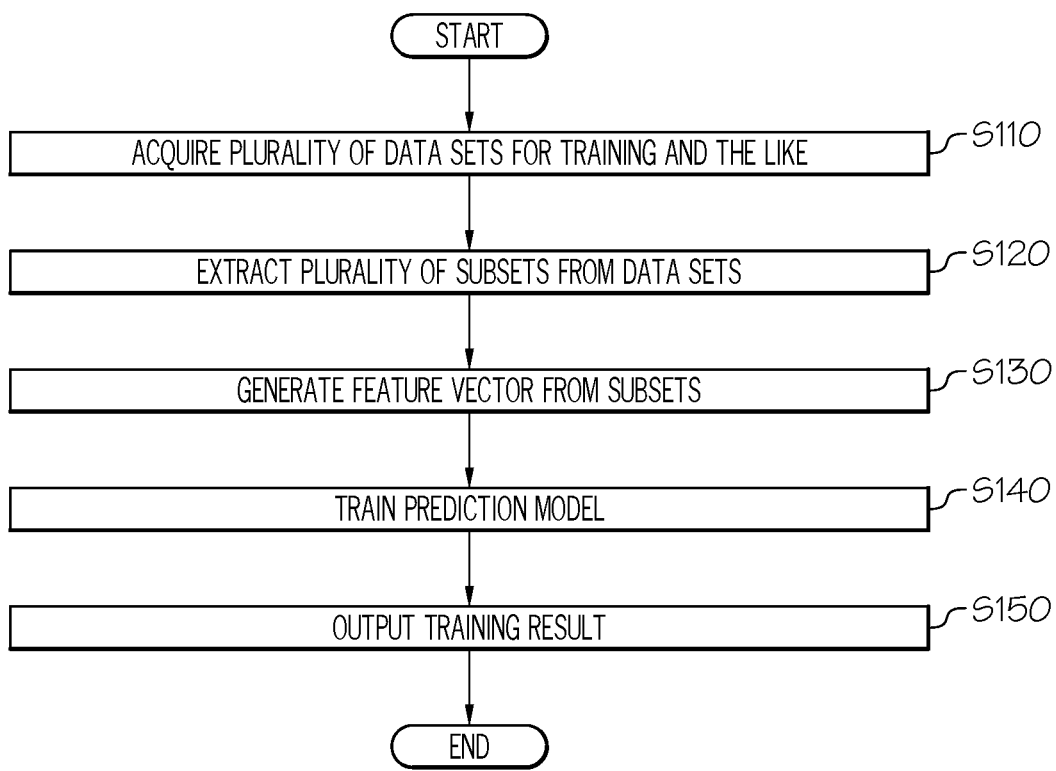
FIG. 3 shows a flow of training processing by the information processing apparatus of the embodiment.

FIG. 3 shows a flow of training processing by the training processing unit 170 of the information processing apparatus 10 of this embodiment. The information processing apparatus 10 uses, as training data used for the training processing, a data set from which a plurality of subsets can be extracted according to a fixed procedure and a label to be allocated to the data set. In the following explanation, as an example, the information processing apparatus 10 uses, as the data set, moving images and the like of a road acquired from a drive recorder and uses, as the label, an MCI measured by a dedicated measurement apparatus in advance. Besides, the information processing apparatus 10 may use nonlinear sets of various data sets and labels such as an image of a product in a manufacturing process and a defect degree of the product as the training data.

First, in S110, the acquiring unit 110 acquires, as the training data, a plurality of explanatory variable sets and a label for training to be allocated to each of the data sets. For example, first, the acquiring unit 110 acquires, from the database 20 provided on the outside or the inside of the information processing apparatus 10, a moving image photographed by a drive recorder mounted on a passenger vehicle, acceleration data in time series measured by an acceleration sensor mounted on the passenger vehicle, and position data by a GPS mounted on the passenger vehicle.

Subsequently, the acquiring unit 110 acquires the positions of the passenger vehicle at times from the GPS and divides the moving image and the acceleration data for each first section length (e.g., 100 m) of a road to which one MCI is allocated in advance. The acquiring unit 110 sets, as a plurality of data sets, the moving image and the acceleration data divided into a plurality of pieces (e.g., N), and sets, as labels to be allocated, MCIs measured in advance corresponding to sections. The acquiring unit 110 supplies the acquired training data to the extracting unit 130.

Subsequently, in S120, the extracting unit 130 extracts a plurality of subsets from each of the plurality of data sets in the training data. For example, the extracting unit 130 extracts a plurality of data sequences continuous in time series as a plurality of subsets from a time-series data set observed over time. As an example, the extracting unit 130 divides, for each second section length (e.g., 10 m) of the road, the moving image and the acceleration data of the data set in time series and extracts, from a plurality of data sequences in each of second sections, a predetermined number (e.g., three) data sequences as the subsets.

The extracting unit 130 may extract, using a sliding window, a plurality of data sequences partially overlapping or not overlapping in time series. For example, the extracting unit 130 extracts a plurality of (e.g., D) subsets including temporal overlap from the moving images and the acceleration data included in the respective data sets.

The extracting unit 130 may extract a set of values of a plurality of explanatory variables as data sequences. As an example, the extracting unit 130 may extract, as the respective data sequences, luminance information, gradient (edge) information of luminance, and the like of road images included in the moving image in each second section length and acceleration on an XYZ axis and the like included in the acceleration data. The extracting unit 130 supplies the extracted plurality of subsets to the vector generating unit 150.

Subsequently, in S130, the vector generating unit 150 generates, concerning each of the subsets, a feature vector including a plurality of feature values. For example, the vector generating unit 150 generates, on the basis of a plurality of data sequences included in a d-th (d∈ D) subset in an n-th (n∈ N) data set, a feature vector $x_{n,d}$ including a plurality of feature values as elements.

For example, the vector generating unit 150 may calculate basic statistical amounts (e.g., averages and/or standard deviation) of the explanatory variables such as the luminance information, the gradient (edge) information of luminance, and the like and the acceleration on the XYZ axis and the like included in the data sequence of the subset and generate the feature vector $x_{n,d}$ including the acquired values as feature values.

Instead, the vector generating unit 150 may generate the feature vector $x_{n,d}$ on the basis of Bag of Words from the plurality of data sequences in the subset. For example, the vector generating unit 150 may define a plurality of kinds of patterns of predetermined values in the explanatory variables in the subset and generate the feature vector $x_{n,d}$ including, as feature values, appearance frequencies (histograms) of the plurality of kinds of patterns detected in the subset. The vector generating unit 150 supplies the generated feature vector to the training processing unit 170.

Subsequently, in S140, the training processing unit 170 trains, in each of the plurality of data sets, a prediction model in which each of the plurality of subsets is weighted and the subsets are reflected on prediction of a label. For example, the training processing unit 170 allocates a different weight coefficients $\eta_{n,d}$ to each of the subsets and trains a prediction model using the weight coefficient $\eta_{n,d}$ for each of the subsets, the feature vector $x_{n,d}$, and a regression vector w including a plurality of regression coefficients respectively corresponding to the plurality of feature values. Consequently, the training processing unit 170 trains a prediction model in which each of the subsets is weighted and the subsets are reflected on a prediction result of a label.

The training processing unit 170 may execute Bayesian inference using prior distributions of the regression vector w and the weight coefficient $\eta_{n,d}$ and the training data D and output posterior probability distributions of the regression vector w and the weight coefficient $\eta_{n,d}$ as a training result.

As an example, the training processing unit 170 may train the regression vector w and the weight coefficient $\eta_{n,d}$ on the basis of a prediction model indicated by Expression 1.

$$p(Y|\chi, w, \beta, \eta) = \\ (2\pi\beta^{-1})^{-\frac{N}{2}} \exp\left(-\frac{\beta}{2}\sum_{n}^{N}\sum_{d}^{Dn} \eta_{n,d} L(y_n, w^T x_{n,d})\right) \ldots$$ [Expression 1]

In the expression, $p(Y|\chi, w, \beta, \eta)$ indicates a probability distribution of a set Y consisting of entire N labels $y_n$ at the time when values of sets $\chi$, w, $\beta$, and $\eta$ consisting of entire N data sets $X_n$ are given values. The set $X_n$ indicates an n-th data set in training data, $D_n$ indicates the number of subsets extracted from the n-th data set, the vector $x_{n,d}$ indicates a feature vector corresponding to a d-th subset in $X_n$, $y_n$ indicates a label allocated to $X_n$ in the training data, $\eta_{n,d}$ indicates a weight coefficient of subsets in which a sum of $\eta_{n,1}$ to $\eta_{n,D}$ is 1, and $\beta$ indicates accuracy of noise. L(·) is an error function and may be, for example, a square error $L(a,b)=(a-b)^2$.

As indicated by Expression 1, the training processing unit 170 may use a prediction model in which, as the probability distribution $p(Y|\chi, w, \beta, \eta)$ of the set Y of the label $y_n$ in the training data, a value of an exponential function including, as an exponent, a number corresponding to a sum of n∈ N and d∈ D of a value obtained by multiplying, by the weight coefficient $\eta_{n,d}$, a term $L(y_n, w^T x_{n,d})$ indicating an error between a label ($w^T x_{n,d}$) predicted for each of subsets d on the basis of the feature vector $x_{n,d}$ and the regression vector w and the label $y_n$ allocated to the corresponding data set of the training data is set.

The training processing unit 170 calculates, using the prediction model, a posterior probability distribution p(w| $\chi$ ,Y) of the regression vector w and a posterior probability distribution p(η| χ ,Y) of the weight coefficient at the time when that entire data of n∈ N is given data. For example, the training processing unit 170 may calculate the posterior probability distribution (p(w| χ ,Y) of the regression vector w by dividing, by a marginal distribution p(Y| χ ) of the set Y of the label $y_n$ serving as a normalization constant, a value obtained by multiplying the probability distribution p(Y| χ ,w,β,η) of the set Y of the label $y_n$ in the training data set with a prior probability distribution p(w) of the regression vector w and marginalizing the probability distribution p(Y| χ ,w,β,η) concerning unnecessary parameters β and η. As an example, the training processing unit 170 may calculate the posterior probability distribution of the regression vector w using p(w| χ ,Y)=[∫p(Y| χ ,w,β,η)×p(w,β,η)dβdη]/[∫p(Y| χ ,w,β,η)×p(w,β,η)dwdβdη].

For example, the training processing unit 170 may calculate the posterior probability distribution (p(η| χ ,Y) of the weight coefficient η by dividing, by a marginal distribution p(Y| χ ) of the set Y of the label $y_n$ serving as the normalization constant, a value obtained by multiplying the probability distribution p(Y| χ ,w,β,η) of the set Y of the label $y_n$ in the training data set with a prior probability distribution p(η) of the weight coefficient η and marginalizing the probability distribution p(Y| χ ,w,β,η) concerning unnecessary parameters w and β. As an example, the training processing unit 170 may calculate the posterior probability distribution of the weight coefficient η using p(η| χ ,Y)=[∫p(Y| χ ,w,β,η)×p(w,β,η)dβdw]/[∫p(Y| χ ,w,β,η)×p(w,β,η)dwdβdη].

The training processing unit 170 may calculate the regression vector w and the weight coefficient η with low computational cost using a variational Bayesian method. In addition or instead of this, the training processing unit 170 may calculate the regression vector w and the weight coefficient η according to sampling such as a Markov Chain Monte Carlo method (MCMC method).

The training processing unit 170 may build a prediction model while simultaneously performing selection of an explanatory variable using ARD (Automatic Relevance Determination). For example, the training processing unit 170 can distinguish an explanatory variable used for prediction of a label and an explanatory variable not used for the prediction of a label among a plurality of explanatory variables by using a sparse model (an ARD prior distribution) for the prior distribution p(w) of the regression vector w. Consequently, the training processing unit 170 can exclude the influence of a redundant explanatory variable (an adverse effect such as multicollinearity) harmful for prediction of a label.

The training processing unit 170 may use a nonlinear prediction model instead of using the linear prediction model indicated by Expression 1. For example, the training processing unit 170 may use, instead of the feature vector $x_{n,d}$, a vector $\phi(x_{n,d})$ in which the feature vector $x_{n,d}$ is input to a basis function. Consequently, the training processing unit 170 is capable of training the nonlinear prediction model. As an example, the training processing unit 170 may train the regression vector w and the weight coefficient $\eta_{n,d}$ on the basis of a prediction model indicated by Expression 2.

$$p(Y|\chi, w, \beta, \eta) = \quad \text{[Expression 2]}$$

-continued
$$\frac{1}{N}\exp\left(-\frac{\beta}{2}\sum_{n}^{N}\sum_{d}^{Dn}\eta_{n,d}L(y_n, w^T\phi(x_{n,d}))\right)\ldots$$

The training processing unit 170 may train a nonlinear prediction model using a Kernel method. For example, the training processing unit 170 may use, as a basis function $\phi(x_{n,d})$, $\phi(x_{n,d})=(\exp(|x_{n,d}-x_{(1)}|)^2, \exp(|x_{n,d}-x_{(2)}|)^2, \ldots,$ and $\exp(|x_{n,d}-x_{(M)}|)^2$. Vectors $x_{(1)}, x_{(2)} \ldots,$ and $x_{(M)}$ are vectors having values of predetermined patterns, which may be, for example, patterns corresponding to values of moving image features and acceleration of a road measured in the past.

The training processing unit 170 compares the feature vector $x_{n,d}$ and the vectors $x_{(1)}, x_{(2)} \ldots,$ and $x_{(M)}$ corresponding to the measurement results in the past and outputs a component in the case in which the compared vectors are the same, as the basis function $\phi(x_{n,d})$ applied to the regression vector w. Consequently, the training processing unit 170 can train an appropriate regression vector w on the basis of the moving images and the like of the road measured in the past.

As another example, the training processing unit 170 may use $\phi(x_{n,d})=(\alpha_1x_1+\alpha_2x_1^2+\alpha_3x_1^3+\ldots\alpha_Zx_1^Z, \alpha_1x_2+\alpha_2x_2^2+\alpha_3x_2^3+\ldots\alpha_Zx_2^Z, \ldots \alpha_1x_M+\alpha_2x_M^2+\alpha_3x_M^3+\ldots\alpha_Zx_M^Z)$ ($\alpha_1, \alpha_2, \ldots,$ and $\alpha_Z$ are constants and $x_1, x_2, \ldots,$ and $x_M$ are elements of the feature vector $x_{n,d}$) to use a prediction model that is a mixed model of the linear model and the nonlinear model.

Further, the training processing unit 170 may train a regression vector and a weight coefficient further using additionally-input training data in addition to trained training data. For example, the training processing unit 170 may use, as prior distributions, the posterior probability distributions of the regression vector and the weight coefficient output on the basis of the training data and output posterior probability distributions of the regression vector and the weight coefficient for the additionally-input training data.

The training processing unit 170 may train the regression vector w and the weight coefficient η according to a weighted method of least squares, a weighted maximum likelihood estimation method, or the like instead of using the weighted Bayesian inference.

Subsequently, in S150, the training processing unit 170 outputs a result of the training. For example, the training processing unit 170 may display the regression vector w and the weight coefficient η obtained as a result of the training on a display screen of the information processing apparatus 10 and/or store the regression vector w and the weight coefficient η in an internal/external storage device of the information processing apparatus 10. The training processing unit 170 supplies the regression vector w and the weight coefficient η obtained as a result of the training to the predicting unit 190.

In this way, the information processing apparatus 10 extracts the plurality of subsets from the data set serving as the target of labeling and simultaneously trains the weight coefficient $\eta_{n,d}$ and the regression vector w for each of the data set and the subsets. Consequently, the information processing apparatus 10 trains a degree of the influence on a label of the subsets (i.e., the weight coefficient $\eta_{n,d}$).

That is, the information processing apparatus 10 specifies a portion having a large influence on an allocated label in the data set. Consequently, the information processing apparatus 10 reduces errors in prediction of a label due to the subsets having a small influence on the label. Therefore, the information processing apparatus 10 can more accurately train the regression vector w.

For example, with the information processing apparatus 10, it is possible to specify a portion representing an allocated MCI in a road. As an example, with the information processing apparatus 10, concerning FIG. 1A, an entire section is specified as the portion representing the MCI. Concerning FIGS. 1B and 1C, a portion with a hole is specified as the portion representing the MCI. Consequently, the information processing apparatus 10 can train a prediction model for predicting MCIs of substantially the same values from completely different features of FIGS. 1A to 1C and train a prediction model for predicting MCIs of completely different values from similar features of FIGS. 1B to 1D. With the information processing apparatus 10, a portion with a large weight coefficient $\eta_{n,d}$ in a data set with a low MCI can be specified as a portion for which repair is actually necessary. Therefore, it is possible to reduce an inspection load on the road.

Figure 4:
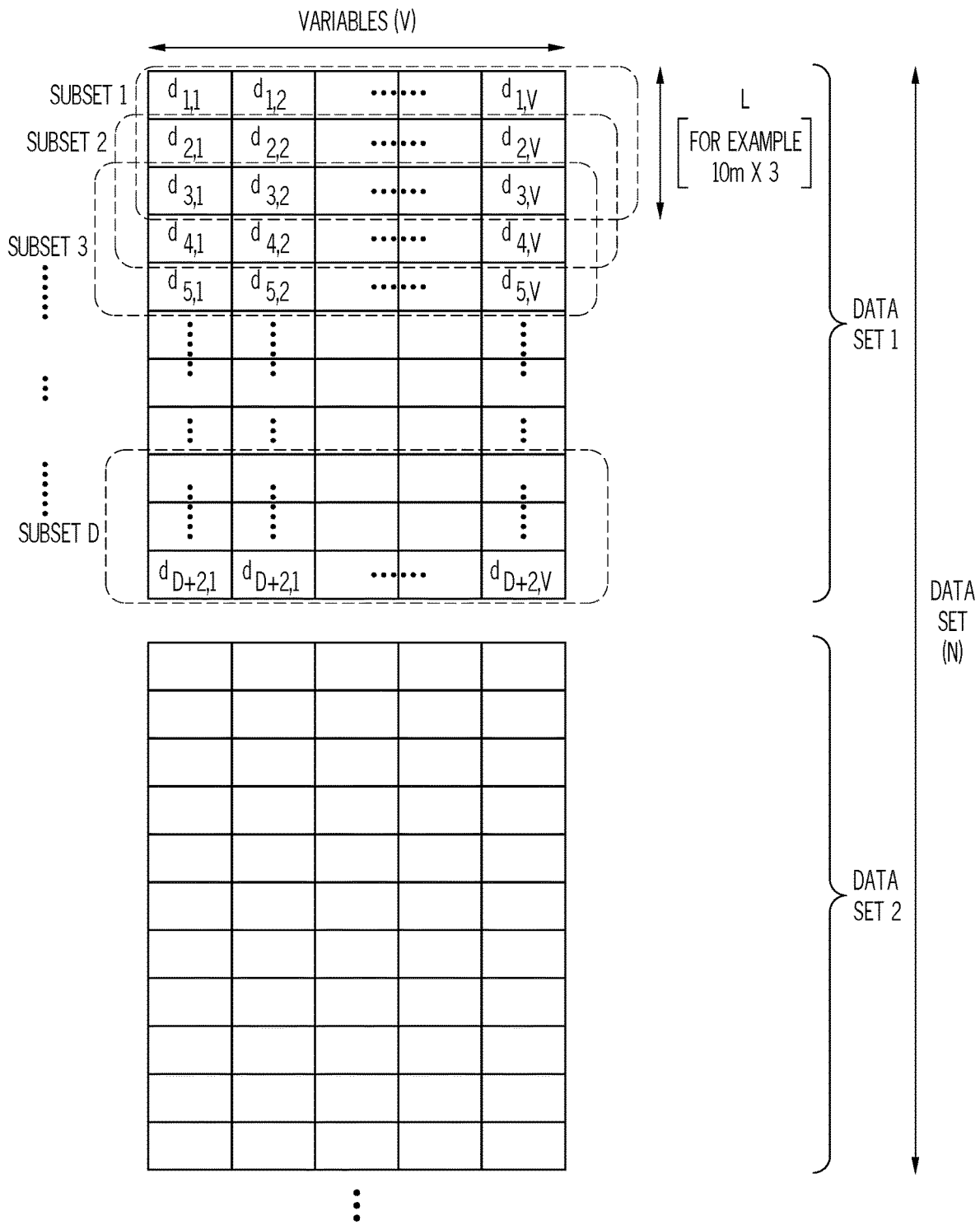
FIG. 4 shows an example of data sets and subsets according to the embodiment.

FIG. 4 shows an example of data sets and subsets of training data according to this embodiment. As shown in the figure, the acquiring unit 110 may acquire N data sets including a data set 1, a data set 2, . . . , and a data set N. The acquiring unit 110 acquires, as the data sets, sets of explanatory variables for each of data sequences. For example, when an MCI of a road is trained, if one data set includes ten data sequences, the acquiring unit 110 acquires, as the data sets, ten data sequences including V explanatory variables (luminance information of the road, etc.) for each second section length (e.g., 10 m).

The extracting unit 130 extracts D subsets including a subset 1, a subset 2, a subset 3, . . . , and a subset D from the data sets (e.g., the data set 1). The extracting unit 130 may acquire L data sequences consisting of the V explanatory variables as the subsets 1 to D. For example, the extracting unit 130 acquires sets of explanatory variables related to continuous three data sequences (e.g., corresponding to 10 m×3 road) as the subsets.

The extracting unit 130 may acquire sets of explanatory variables including data sequences overlapping one another as the subsets. For example, as shown in the figure, the extracting unit 130 may acquire a set of explanatory variables $d_{1,1}$ to $d_{3,V}$ related to first to third data sequences as the subset 1, acquire a set of explanatory variables $d_{2,1}$ to $d_{4,V}$ related to second to fourth data sequences as a subset 2, acquire a set of explanatory variables $d_{3,1}$ to $d_{5,V}$ related to third to fifth data sequences as the subset 3, and acquire a set of explanatory variables $d_{3,1}$ to $d_{D+2,V}$ related to D-th to D+2-th data sequences as a subset D.

Figure 5:
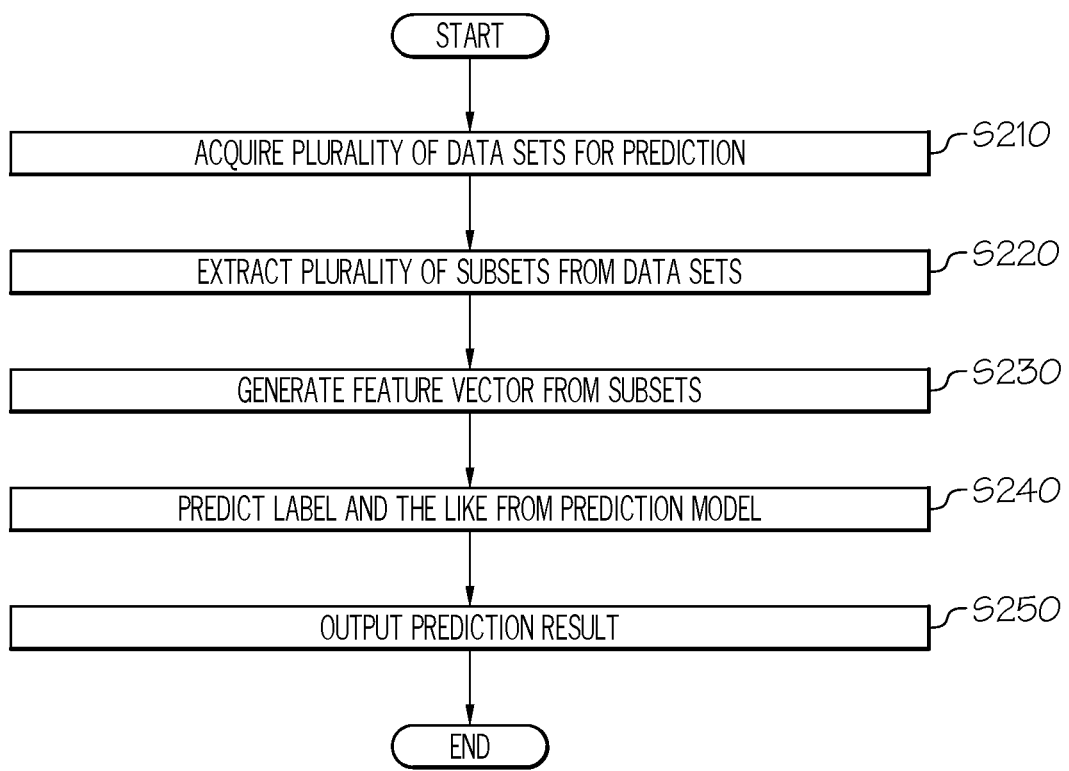
FIG. 5 shows a processing flow of label prediction by the information processing apparatus of the embodiment.

FIG. 5 shows a processing flow of label prediction by the predicting unit 190 of the information processing apparatus 10 of this embodiment. In this embodiment, the information processing apparatus 10 executes processing in S210 to S250 to thereby execute a simulation based on a prediction model.

First, in S210, the acquiring unit 110 acquires prediction target data including a plurality of data sets serving as prediction targets. The acquiring unit 110 may acquire the plurality of data sets serving as the prediction targets according to a method same as the acquisition of the plurality of data sets in S110. The acquiring unit 110 supplies the acquired prediction target data to the extracting unit 130.

Subsequently, in S220, the extracting unit 130 extracts a plurality of prediction target subsets from each of the plurality of data sets in the prediction target data. The extracting unit 130 may extract the plurality of prediction target subsets according to a method same as the extraction of the plurality of subsets from the training data in S120. The extracting unit 130 supplies the extracted plurality of prediction target subsets to the vector generating unit 150.

Subsequently, in S230, the vector generating unit 150 generates, concerning each of the prediction target subsets, a feature vector including a plurality of feature values. The vector generating unit 150 may generate the feature vector concerning the prediction target subsets according to the method same as S130. The vector generating unit 150 supplies the generated feature vector to the predicting unit 190.

In S240, the predicting unit 190 predicts labels corresponding to the plurality of prediction target data sets of the prediction target data on the basis of the prediction model trained by the training processing unit 170. For example, the predicting unit 190 may simultaneously predict, on the basis of a prediction model of Expression 3, using the trained regression vector w, a label $y_{n'}$ and a weight coefficient $\eta_{n',d}$ corresponding to a prediction target data set $X_{n'}$.

$$p(y_{n'} \mid X_{n'}, w, \beta, \eta) = \qquad\text{[Expression 3]}$$
$$(2\pi\beta^{-1})^{-\frac{N}{2}} \exp\left(-\frac{\beta}{2}\sum_{d}^{Dn} \eta_{n',d} L(y_{n'}, w^T x_{n',d})\right)\dots$$

For example, the predicting unit 190 may set, as a label predicted from the data set $X_{n'}$ of the prediction target data, the label $y_{n'}$ in a set of the label $y_{n'}$ and the weight coefficient $\eta_{n',d}$ that gives a maximum to an input probability $p(y_{n'}|X_{n'}, w,\beta,\eta)$ to which the trained w and $\beta$ are input.

For example, the predicting unit 190 may set a posterior probability distribution of the regression vector w included in the training result as $p(w|Y, \chi)$ and set a prior probability distribution of the weight coefficient $\eta_{n,d}$ as $p(\eta)$ to thereby marginalize the regression vector w and the weight coefficient $\eta$ and calculate a probability distribution $p(y_{n'}|X_{n'}, Y, \chi, \beta)$ of the label $y_{n'}$ according to Expression 4. The predicting unit 190 may set a posterior probability distribution of the noise parameter $\beta$ as $p(\beta|Y, \chi)$ and marginalize one, two, or all of the regression vector w, the weight coefficient $\eta$, and the noise parameter $\beta$ (e.g., the weight coefficient $\eta$ and the noise parameter $\beta$).

$$p(y_{n'}|X_{n'},Y,\chi,\beta)=\int p(y_{n'}|X_{n'},w,\beta,\eta)p(\eta)p(w|Y,\chi)d\eta dw \qquad\text{[Expression 4]}$$

[The predicting unit 190 may perform simple prediction by predicting only the label $y_{n'}$ without predicting the weight coefficient $\eta_{n',d}$. For example, the predicting unit 190 may set, for example, an average and/or a median in d=1 to d=Dn of the prediction value ($wX_{n',d}$) of each of the subsets as a prediction value and predict the label $y_{n'}$.

Subsequently, in S250, the predicting unit 190 outputs the prediction result. For example, the predicting unit 190 may display the label $y_n$ obtained by the prediction on the display screen of the information processing apparatus 10 and/or store the label $y_n$ in the internal/external storage device of the information processing apparatus 10.

The predicting unit 190 may supply, every time prediction target data is obtained, the prediction target data to the training processing unit 170. The training processing unit 170 may set, as additional training data, the prediction target data and further train a prediction model on the basis of the prediction target data. Consequently, the information processing apparatus 10 can update the prediction model using the prediction target data such that a prediction result is more accurate.

In this way, the information processing apparatus 10 predicts the corresponding label $y_{n'}$ from the prediction target data $X_{n'}$ using the weight coefficient $\eta_{n,d}$ and the regression vector w trained by the training processing unit 170. Consequently, the information processing apparatus 10 can more accurately predict the label $y_{n'}$ using the regression vector w regressed taking into account the influence on a label for each of subsets.

Figure 6:
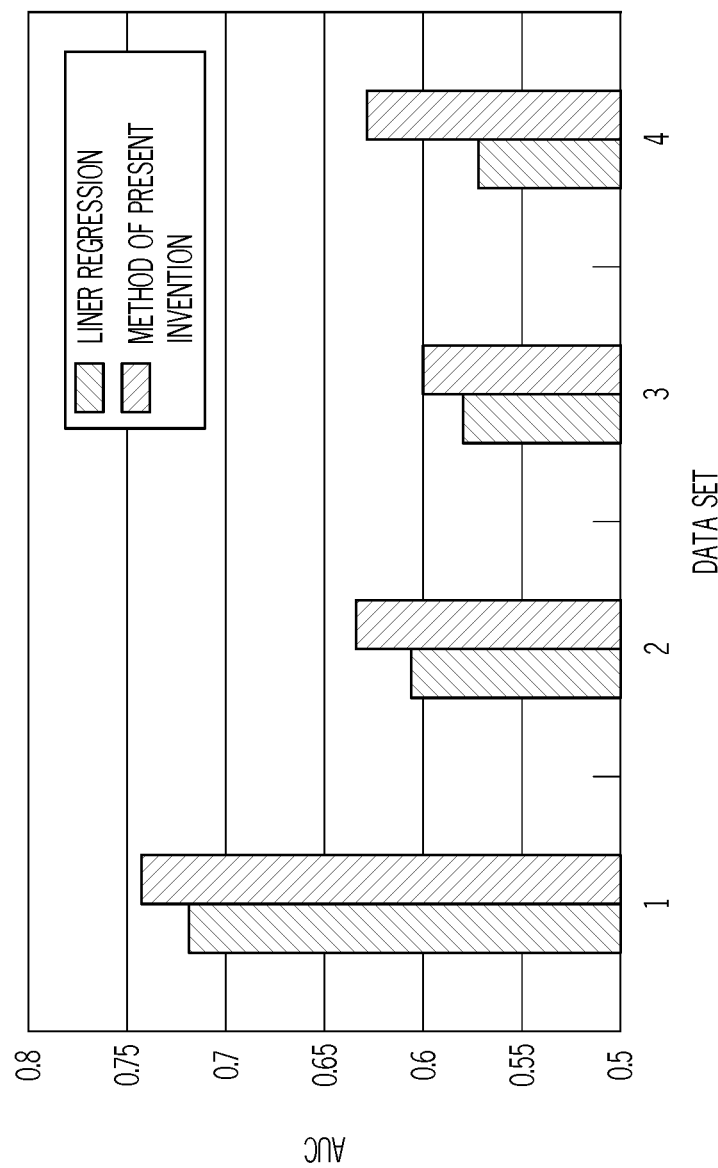
FIG. 6 shows prediction accuracy by the information processing apparatus of the embodiment.

FIG. 6 shows prediction accuracy by the information processing apparatus 10 of this embodiment. In FIG. 6, a result obtained by evaluating, with cross-validation, an AUC (Area Under Curve) in the case in which a label (an MCI) is predicted by the conventional sparse linear regression method and an AUC in the case in which a prediction model is built through an ARD prior distribution and variational Bayesian implementation according to full-Bayes modeling in the information processing apparatus 10 of this embodiment is shown with respect to different four data sets 1 to 4 obtained from a drive recorder or the like. The AUC indicates a ratio of successfully accurately predicting whether the MCI is equal to or larger than 5 or smaller than 5.

As explanatory variables included in the data set, data of 7 variables×every 1 second obtained from an acceleration sensor and data of 90 variables×every 0.1 second obtained from a drive recorder (a camera) are used. As labels, five hundred MCI values recorded in 100 m units are used. In the MCIs and the data sets 3 and 4 corresponding to the data sets 1 and 2, different calculation formulas are used for calculation of the corresponding MCIs. Pre-processing using heuristics is applied to the data sets 1 and 3. The pre-processing is not applied to the data sets 2 and 4.

As shown in the figure, in all of the data sets 1 to 4, according to the method of this embodiment, AUCs about several % high compared with the conventional linear regression are obtained. This indicates that the information processing apparatus 10 of this embodiment can predict a label at high accuracy compared with the conventional method.

In this embodiment, the information processing apparatus 10 generates one kind of the feature vector $x_{n,d}$ from the training data and the prediction target data and uses one kind of the weight coefficient $\eta_{n,d}$ for the training data and the prediction target data. As an alternative modification, the information processing apparatus 10 may use a plurality of kinds of feature vectors $x^1_{n,d}, x^2_{n,d}, \ldots$ and a plurality of kinds of coefficients $\eta^1_{n,d}, \eta^2_{n,d}, \ldots$ corresponding to the feature vectors. For example, the information processing apparatus 10 may generate a feature vector $x^1_{n,d}$ obtained by vectorizing features of a moving image of the drive recorder, generate a feature vector $x^2_{n,d}$ obtained by vectorizing features of a measurement value of the acceleration sensor, and train weight coefficients $\eta^1_{n,d}$ and $\eta^2_{n,d}$ for each of the feature vectors.

Consequently, the information processing apparatus 10 can perform different weighting for each of groups of the explanatory variables included in the data set and train a label. For example, the information processing apparatus 10 can more accurately train a label for training data when a moving image of the drive recorder greatly affects a label in a certain portion of the data set but a value of acceleration greatly affects the label in another portion.

Figure 7:
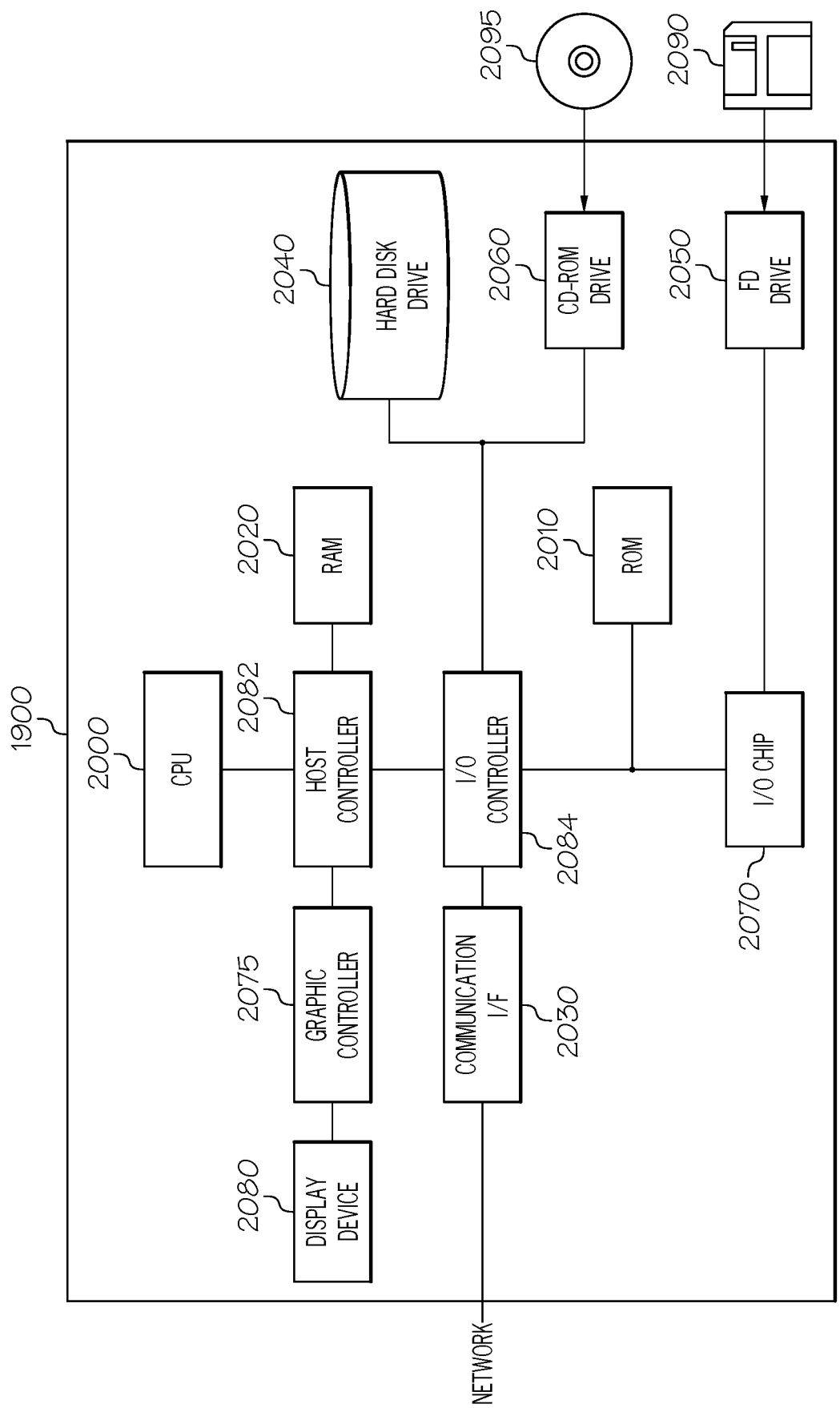
FIG. 7 shows an example of a hardware configuration of a computer.

FIG. 7 shows an example of a hardware configuration of a computer 1900 functioning as the information processing apparatus 10. The computer 1900 according to this embodiment includes a CPU peripheral section including a CPU 2000, a RAM 2020, a graphic controller 2075, and a display device 2080 connected to one another by a host controller 2082, an input and output section including a communication interface 2030, a hard disk drive 2040, and a CD-ROM drive 2060 connected to the host controller 2082 by an input and output controller 2084, and a legacy input and output section including a ROM 2010, a flexible disk drive 2050, and an input and output chip 2070 connected to the input and output controller 2084.

The host controller 2082 connects the RAM 2020 and the CPU 2000 and the graphic controller 2075 that access the RAM 2020 at a high transfer rate. The CPU 2000 operates on the basis of programs stored in the ROM 2010 and the RAM 2020 and performs control of the sections. The graphic controller 2075 acquires image data generated by the CPU 2000 or the like on a frame buffer provided in the RAM 2020 and causes the display device 2080 to display the image data. Instead, the graphic controller 2075 may include, on the inside, a frame buffer that stores image data generated by the CPU 2000 or the like.

The input and output controller 2084 connects the host controller 2082, the communication interface 2030, which is a relatively high-speed input and output device, the hard disk drive 2040, and the CD-ROM drive 2060. The communication interface 2030 communicates with other devices via a network by wire or by radio. The communication interface functions as hardware that performs communication. The hard disk drive 2040 stores programs and data used by the CPU 2000 in the computer 1900. The CD-ROM drive 2060 reads a program or data from a CD-ROM 2095 and provides the hard disk drive 2040 with the program or the data via the RAM 2020.

The ROM 2010, the flexible disk drive 2050, and a relatively low-speed input and output device of the input and output chip 2070 are connected to the input and output controller 2084. The ROM 2010 stores, for example, a boot program executed by the computer 1900 during start and/or a program relying on the hardware of the computer 1900. The flexible disk drive 2050 reads a program or data from a flexible disk 2090 and provides the hard disk drive 2040 with the program or the data via the RAM 2020. The input and output chip 2070 connects the flexible disk drive 2050 to the input and output controller 2084 and connects various input and output devices to the input and output controller 2084 via, for example, a parallel port, a serial port, a keyboard port, and a mouse port.

The program provided to the hard disk drive 2040 via the RAM 2020 is stored in a recording medium such as the flexible disk 2090, the CD-ROM 2095, or an IC card and provided by a user. The program is read out from the recording medium, installed in the hard disk drive 2040 in the computer 1900 via the RAM 2020, and executed in the CPU 2000.

Programs installed in the compute 1900 and causing the computer 1900 to function as the information processing apparatus 10 include an acquisition module, an extraction module, a vector generation module, a training processing module, and a prediction module. These programs or modules may act on the CPU 2000 and the like and respectively cause the computer 1900 to function as the feature value acquiring unit 110, the extracting unit 130, the vector generating unit 150, the training processing unit 170, and the predicting unit 190.

Information processing described in these programs is read by the computer 1900 to thereby function as the feature value acquiring unit 110, the extracting unit 130, the vector generating unit 150, the training processing unit 170, and the predicting unit 190, which are specific means in which software and the various hardware resources described above cooperate with each other. Calculation or processing of information corresponding to a purpose of use of the computer 1900 in this embodiment is realized by these specific means, whereby the peculiar information processing apparatus 10 corresponding to the purpose of use is built.

As an example, when communication is performed between the computer 1900 and an external apparatus or the like, the CPU 2000 executes a communication program loaded on the RAM 2020 and instructs, on the basis of processing contents described in the communication program, the communication interface 2030 to perform communication processing. The communication interface 2030 is controlled by the CPU 2000, reads out transmission data stored in a transmission buffer region or the like provided on a storage device such as the RAM 2020, the hard disk drive 2040, the flexible disk 2090, or the CD-ROM 2095, and transmits the transmission data to a network or writes reception data received from the network in a reception buffer region or the like provided on the storage device. In this way, the communication interface 2030 may transfer the transmission and reception data to and from the storage device according to a DMA (direct memory access) system. Instead, the CPU 2000 may read out data from the storage device or the communication interface 2030 at a transfer source and write data in the communication interface 2030 or the storage device at the transfer destination to thereby transfer the transmission and reception data.

The CPU 2000 causes the RAM 2020 to read, through DMA transfer or the like, all or a necessary portion of a file, a database, or the like stored in an external storage device such as the hard disk drive 2040, the CD-ROM drive 2060 (the CD-ROM 2095), or the flexible disk drive 2050 (the flexible disk 2090) and applies various kinds of processing to data on the RAM 2020. The CPU 2000 writes back the data subjected to the processing to the external storage device through the DMA transfer or the like. In such processing, the RAM 2020 can be regarded as temporarily retaining contents of the external storage device. Therefore, in this embodiment, the RAM 2020, the external storage device, and the like are collectively referred to as memory, storing unit, storage device, or the like.

For example, the storing unit of the information processing apparatus 10 may store, as appropriate, data received from/provided to the feature value acquiring unit 110, the extracting unit 130, the vector generating unit 150, the training processing unit 170, and the predicting unit 190. For example, the storing unit may receive and store data input from the acquiring unit 110. The storing unit may store, for example, a result of training of the training processing unit 170.

Note that, in the explanation of this embodiment, when it is described that information (e.g., a plurality of data sets) is supplied from one component (e.g., the acquiring unit 110) to another component (e.g., the extracting unit 130), this description may include not only directly passing the information from the one component to the other component but also passing the information via storage of information in and readout of the information from the storing unit.

Various kinds of information such as various programs, data, tables, and databases in this embodiment are stored in such a storage device and serve as targets of information processing. Note that the CPU 2000 can also retain a part of the RAM 2020 in a cache memory and perform reading and writing on the cache memory. In such a form as well, since the cache memory plays a part of the function of the RAM 2020, in this embodiment, except when being distinguished and shown, the cache memory is also included in the RAM 2020, the memory, and/or the storage device.

The CPU 2000 applies, to data read out from the RAM 2020, various kinds of processing including the various kinds of calculation, the processing of information, the condition determination, and the retrieval and substitution of information described in this embodiment designated by a command sequence of a program and writes back the data to the RAM 2020. For example, when the condition determination is performed, the CPU 2000 determines whether the various variables described in this embodiment satisfy a condition that the variables are, for example, larger, smaller, equal to or larger than, or equal to or smaller than other variables or constants. When the condition holds (or does not hold), the CPU 2000 branches to a different command sequence or invokes a subroutine.

The CPU 2000 can retrieve information stored in the file, the database, or the like of the storage device. For example, when a plurality of entries in which attribute values of a second attribute are respectively associated with attribute values of a first attribute are stored in the storage device, the CPU 2000 can obtain an attribute value of the second attribute associated with the first attribute satisfying a predetermined condition by retrieving an entry in which an attribute value of the first attribute coincides with a designated condition out of the plurality of entries stored in the storage device and reading out an attribute value of the second attribute stored in the entry.

The present invention is described above with reference to the embodiment. However, the technical scope of the present invention is not limited to the embodiment. It is evident for those skilled in the art that it is possible to add a variety of alterations or improvements to the embodiment. It is evident from the description of the claims that forms added with such alterations or improvements are also included in the technical scope of the present invention.

It should be noted that the execution order of the respective kinds of processing such as the operations, the procedures, the steps, and the stages in the apparatus, the system, the program, and the method described in the claims, the specification, and the drawings can be realized in any order unless "before", "prior to", and the like are clearly indicated in particular or an output of the preceding processing is used in the following processing. Even if the operation flows in the claims, the specification, and the drawings are described using "first", "subsequently", and the like for convenience, this does not mean that it is essential to carry out the operation flows in this order.

REFERENCE SIGNS LIST

10 . . . Information processing apparatus
20 . . . Database
110 . . . Acquiring unit
130 . . . Extracting unit
150 . . . Vector generating unit
170 . . . Training processing unit
190 . . . Predicting unit
1900 . . . Computer
2000 . . . CPU
2010 . . . ROM
2020 . . . RAM
2030 . . . Communication interface
2040 . . . Hard disk drive
2050 . . . Flexible disk drive 2060 . . . CD-ROM drive
2070 . . . Input and output chip
2075 . . . Graphic controller
2080 . . . Display device
2082 . . . Host controller
2084 . . . Input and output controller
2090 . . . Flexible disk
2095 . . . CD-ROM

What is claimed is:

1. A method for training a prediction model for predicting a label to be allocated to a prediction target explanatory variable set, the method comprising:
   acquiring a set of training data comprising a set of explanatory variables and a label allocated to the set of explanatory variables;
   extracting a plurality of explanatory variable subsets from the set of explanatory variables, wherein respective ones of the plurality of explanatory variable subsets are allocated a different weight coefficient;
   generating a feature vector, concerning each of the plurality of explanatory variable subsets, the feature vector comprising a plurality of feature values;
   executing Bayesian inference using prior distributions of a regression vector comprising a plurality of regression coefficients respectively corresponding to the plurality of feature values of the feature vector;
   training a prediction model utilizing the plurality of explanatory variable subsets, the different weight coefficients, the feature vector, the regression vector, and an objective function to be reduced, the objective function comprising a weighted sum of terms indicating errors between labels predicted for the plurality of explanatory variable subsets based on the feature vector and the regression vector, and the label allocated to the set of explanatory variables; and
   outputting a posterior probability distribution of the regression vector and the different weight coefficients as a training result.

2. The method according to claim 1, wherein training the prediction model further comprises:
   utilizing, as prior distributions, the posterior probability distribution of the regression vector and the weight coefficients; and
   outputting posterior probability distributions of the regression vector and the weight coefficients for additional training data.

3. The method according to claim 1, wherein the set of training data is a time-series data set observed over time, and wherein the extracting further comprises:
   extracting, as the plurality of explanatory variable subsets, a plurality of data sequences continuous in time series.

4. The method according to claim 3, wherein the plurality of data sequences comprises a set of values of a plurality of feature values in a plurality of sections.

5. The method according to claim 3, wherein the plurality of data sequences partially overlap one another in a time series.

6. The method according to claim 1, wherein the acquiring further comprises:
   acquiring a prediction target data set comprising the prediction target explanatory variable set, and wherein the method further comprises:
      generating the predicted label corresponding to the prediction target explanatory variable set based on the prediction model.

7. The method according to claim 6, wherein the training further comprises:
   setting, as additional training data, the prediction target data set; and
   further training the prediction model based on the prediction target data set.

8. An information processing apparatus for training a prediction model for predicting a label to be allocated to a prediction target explanatory variable set, the information processing apparatus comprising:
   a memory;
   a processor communicatively coupled to the memory, wherein the processor is configured to perform operations of:
   acquire a set of training data, the set of training data comprising a set of explanatory variables and a label allocated to the set of explanatory variables;
   extract a plurality of explanatory variable subsets from the set of explanatory variables, wherein respective ones of the plurality of explanatory variable subsets are allocated a different weight coefficient;
   generate a feature vector, concerning each of the plurality of explanatory variable subsets, the feature vector comprising a plurality of feature values;
   executing Bayesian inference using prior distributions of a regression vector comprising a plurality of regression coefficients respectively corresponding to the plurality of feature values of the feature vector;
   train a prediction model utilizing the plurality of explanatory variable subsets, the different weight coefficients, the feature vector, the regression vector, and an objective function to be reduced, the objective function comprising a weighted sum of terms indicating errors between labels predicted for the plurality of explanatory variable subsets based on the feature vector and the regression vector, and the label allocated to the set of explanatory variables; and
   output a posterior probability distribution of the regression vector and the different weight coefficients as a training result.

9. The information processing apparatus according to claim 8, wherein the processor configured to acquire is further configured to:
   acquire a prediction target data set comprising the prediction target explanatory variable set, and wherein the information processing apparatus is further configured to:
      generate the predicted label corresponding to the prediction target explanatory variable set based on the prediction model.

10. The information processing apparatus according to claim 8, wherein the processor configured to train the prediction model is further configured to:
    utilize, as prior distributions, the posterior probability distribution of the regression vector and the weight coefficients; and
    output posterior probability distributions of the regression vector and the weight coefficients for additional training data.

11. The information processing apparatus according to claim 8, wherein the set of training data is a time-series data set observed over time, and wherein the processor configured to extract is further configured to:
    extract, as the plurality of explanatory variable subsets, a plurality of data sequences continuous in time series.

12. The information processing apparatus according to claim 11, wherein the plurality of data sequences comprises a set of values of a plurality of feature values in a plurality of sections.

13. The information processing apparatus according to claim 11, wherein the plurality of data sequences partially overlap one another in a time series.

14. The information processing apparatus according to claim 9, wherein the processor configured to train is further configured to:
set, as additional training data, the prediction target data set; and
further train the prediction model based on the prediction target data set.

15. A computer program product for training a prediction model for predicting a label to be allocated to a prediction target explanatory variable set, the computer program product comprising a computer readable storage medium having program instructions embodied therewith, the program instructions executable by a computer to cause the computer to perform a method comprising:
acquiring a set of training data comprising a set of explanatory variables and a label allocated to the set of explanatory variables;
extracting a plurality of explanatory variable subsets from the set of explanatory variables, wherein respective ones of the plurality of explanatory variable subsets are allocated a different weight coefficient;
generating a feature vector, concerning each of the plurality of explanatory variable subsets, the feature vector comprising a plurality of feature values;
executing Bayesian inference using prior distributions of a regression vector comprising a plurality of regression coefficients respectively corresponding to the plurality of feature values of the feature vector;
training a prediction model utilizing the plurality of explanatory variable subsets, the different weight coefficients, the feature vector, the regression vector, and an objective function to be reduced, the objective function comprising a weighted sum of terms indicating errors between labels predicted for the plurality of explanatory variable subsets based on the feature vector and the regression vector, and the label allocated to the set of explanatory variables the set of training data, wherein the prediction model generates a predicted label to be allocated to a prediction target explanatory variable set with each of the plurality of explanatory variable subsets allocated a different weight coefficient and a regression vector comprising a plurality of regression coefficients respectively corresponding to the plurality of feature values of the feature vector and the different weight coefficient of each of the plurality of explanatory variables; and
outputting a posterior probability distribution of the regression vector and the different weight coefficients as a training result.

16. The computer program product according to claim 15, wherein the program instructions configured for training the prediction model comprise additional program instructions executable by the computer to cause the computer to perform the method further comprising:
utilizing, as prior distributions, the posterior probability distribution of the regression vector and the weight coefficients; and
outputting posterior probability distributions of the regression vector and the weight coefficients for additional training data.

17. The computer program product according to claim 15, wherein the set of training data is a time-series data set observed over time, and wherein the program instructions for extracting comprises additional program instructions executable by the computer to cause the computer to perform the method further comprising:
extracting, as the plurality of explanatory variable subsets, a plurality of data sequences continuous in time series.

18. The computer program product according to claim 17, wherein the plurality of data sequences comprises a set of values of a plurality of feature values in a plurality of sections.

19. The computer program product according to claim 17, wherein the plurality of data sequences partially overlap one another in a time series.

20. The computer program product according to claim 15, wherein the program instructions for acquiring comprise additional program instructions executable by the computer to cause the computer to perform the method further comprising:
acquiring a prediction target data set comprising the prediction target explanatory variable set, and wherein the method further comprises:
generating the predicted label corresponding to the prediction target explanatory variable set based on the prediction model; and
wherein the program instructions for training comprise additional program instructions executable by the computer to cause the computer to perform the method further comprising:
setting, as additional training data, the prediction target data set; and
further training the prediction model based on the prediction target data set.

* * * * *